United States Patent
Voit et al.

(10) Patent No.: US 12,432,115 B2
(45) Date of Patent: Sep. 30, 2025

(54) CLIENT-AWARE FLOORPLAN MANAGEMENT WITH PREDICTED CONFIDENCE LEVELS

(71) Applicant: Cisco Technology, Inc., San Jose, CA (US)

(72) Inventors: Eric A. Voit, Bethesda, MD (US); Carlos Pignataro, Cary, NC (US); Kasi R. Nalamalapu, Pleasanton, CA (US); Salvatore Valenza, Pomy (CH); Samer M. Salam, Beirut (LB)

(73) Assignee: Cisco Technology, Inc., San Jose, CA (US)

( * ) Notice: Subject to any disclaimer, the term of this patent is extended or adjusted under 35 U.S.C. 154(b) by 15 days.

(21) Appl. No.: 18/350,873

(22) Filed: Jul. 12, 2023

(65) Prior Publication Data
US 2025/0023777 A1    Jan. 16, 2025

(51) Int. Cl.
*H04L 41/08*    (2022.01)
*H04L 41/083*   (2022.01)
(Continued)

(52) U.S. Cl.
CPC ........ *H04L 41/0833* (2013.01); *H04L 41/083* (2013.01); *H04L 41/12* (2013.01); *H04L 41/147* (2013.01)

(58) Field of Classification Search
None
See application file for complete search history.

(56) References Cited

U.S. PATENT DOCUMENTS

2005/0073980 A1   4/2005  Thomson et al.
2006/0019679 A1*  1/2006  Rappaport .......... G01S 5/02521
                                                      455/456.1
(Continued)

FOREIGN PATENT DOCUMENTS

WO    2021182932 A1    9/2021

OTHER PUBLICATIONS

International Search Report and Written Opinion for International Application No. PCT/US2024/037454, mailed Oct. 17, 2024, 16 Pages.

*Primary Examiner* — June Sison
(74) *Attorney, Agent, or Firm* — Rutan & Tucker, LLP; Ravi Mohan

(57) ABSTRACT

Devices, systems, methods, and processes for managing network devices through generated predictions and associated confidence levels are described herein. Networks within a floorplan can be operated at full capacity all day in an inefficient way when not adjusted due to traffic patterns and seasonality changes. Data related to the topology of the network, along with historical data can be utilized to generate predictions of various network needs. For example, the overall network throughput capacity needs may be predicted for a series of points in the future. An associated confidence level can be generated as well including one or more confidence intervals. These can be utilized to select a future need for the network and generate a corresponding sustainable network configuration for the network devices and/or their transceivers that can provide sufficient network needs while minimizing the overall power used. This can be automated over time once trust has been established.

20 Claims, 9 Drawing Sheets

(51) Int. Cl.
*H04L 41/0833* (2022.01)
*H04L 41/12* (2022.01)
*H04L 41/147* (2022.01)

(56) References Cited

U.S. PATENT DOCUMENTS

| | | |
|---|---|---|
| 2017/0272310 A1 | 9/2017 | Rengarajan et al. |
| 2018/0060476 A1 | 3/2018 | Kasch et al. |
| 2018/0102858 A1* | 4/2018 | Tiwari ................. H04L 67/566 |
| 2019/0052565 A1* | 2/2019 | Modi ................... H04L 47/283 |
| 2019/0230620 A1 | 7/2019 | Ohlarik et al. |
| 2019/0280918 A1* | 9/2019 | Hermoni .............. H04L 41/069 |
| 2020/0242136 A1 | 7/2020 | Chambers et al. |
| 2021/0092616 A1* | 3/2021 | Desai .................. H04B 17/364 |
| 2023/0027175 A1 | 1/2023 | Valenza et al. |
| 2023/0308199 A1* | 9/2023 | Svennebring ......... H04W 24/10 |

* cited by examiner

CLIENT-AWARE FLOORPLAN MANAGEMENT WITH PREDICTED CONFIDENCE LEVELS

The present disclosure relates to networking. More particularly, the present disclosure relates to managing a plurality of network devices within a floorplan by determining overall current and predicted future bandwidth capacity needs and implementing a sustainable configuration to provide sufficient coverage with minimal power usage.

BACKGROUND

In networking, access points (APs) can be fitted with various types of antennas or transceivers to cover a given environment or floorplan with sufficient radio signals to provide adequate or at least a minimum amount of service. However, many APs are stationary and cannot easily be moved when the situation changes within the environment. For example, in an office setting, workers may come and go during the workday, leaving demand heavy during the day, but negligible at night. Likewise, meetings may occur that cause migration of many workers and their devices (laptops, phones, internet of things (IoT) devices, etc.) from one area of the environment to another.

These setups can lead to sub-optimal coverage patterns and power usage. Without accounting for these changing conditions, APs may be transmitting at full power all of the time, even when there are not enough clients to warrant such coverage. As a result, power usage is wasted. However, simply lowering power usage or turning off devices or transceivers can lead to issues with acceptable service levels since a change in capacity demand may be sudden. Without confident predictions on future capacity needs, sub-optimal coverage and power usage may continue indefinitely.

SUMMARY OF THE DISCLOSURE

Systems and methods for managing a plurality of network devices within a floorplan by determining overall current and predicted future bandwidth capacity needs and implementing a sustainable configuration to provide sufficient coverage with minimal power usage in accordance with embodiments of the disclosure are described herein. In some embodiments, a device, includes a processor, at least one network interface controller configured to provide access to a network, and a memory communicatively coupled to the processor, wherein the memory includes a network capacity prediction logic. The logic is configured to determine a plurality of network devices within a floorplan, predict one or more needs of those plurality of network devices, generate one or more confidence levels wherein the one or more confidence levels are based on at least the predicted one or more needs, and determine one or more network device configurations for at least one of the plurality of network devices.

In some embodiments, the network capacity prediction logic is further configured to transmit the one or more network device configurations to the plurality of network devices.

In some embodiments, the one or more needs is bandwidth capacity.

In some embodiments, the one or more network device configurations include at least transceiver power settings.

In some embodiments, the one or more network device configurations include at least a command for a network device to enter a lower-power mode.

In some embodiments, the one or more network device configurations are configured to provide sufficient bandwidth capacity within the floorplan.

In some embodiments, the sufficient bandwidth capacity is determined based on the one or more predicted needs of the plurality of network devices.

In some embodiments, the one or more network configurations provide sufficient bandwidth capacity while minimizing an amount of power required from the plurality of network devices.

In some embodiments, the network capacity prediction logic is further configured to evaluate historical data associated with the plurality of network devices.

In some embodiments, the predicted one or more needs is based on at least the determined plurality of network devices and the evaluated historical data.

In some embodiments, the predicted one or more needs are associated with a series of future time periods.

In some embodiments, the one or more confidence levels are associated with each of the series of time periods in the future.

In some embodiments, each of the series of time periods has one or more confidence intervals associated with it.

In some embodiments, a device, includes a processor, at least one network interface controller configured to provide access to a network, and a memory communicatively coupled to the processor, wherein the memory includes a network capacity prediction logic. The logic is configured to determine a plurality of network devices within a floorplan, receive a desired latency period, determine a method of prediction generation based on the desired latency period, and predict one or more needs of those plurality of network devices. The logic can also be configured to generate one or more confidence levels wherein the one or more confidence levels are based on at least the predicted one or more needs, and determine one or more network device configurations for at least one of the plurality of network devices.

In some embodiments, the method of prediction can include at least one or more thresholds.

In some embodiments, the method of prediction can include at least an autoregressive moving average.

In some embodiments, the method of prediction can include at least one or more machine-learning processes.

In some embodiments, the method of prediction can include a plurality of methods of increasing complexity.

In some embodiments, a longer desired latency period can be correlated to a method of prediction of increased complexity.

In some embodiments, a method for managing a network associated with a floorplan, includes determining a plurality of network devices within a floorplan by receiving topology data, receiving a desired latency period, determining a method of generating predictions based on at least the desired latency period, and predicting one or more needs of those plurality of network devices utilizing the determined method. The method can also include generating one or more confidence levels wherein the one or more confidence levels are based on at least the predicted one or more needs, determining one or more network device configurations for at least one of the plurality of network devices, and transmitting the one or more network device configurations to the at least one of the plurality of network devices.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
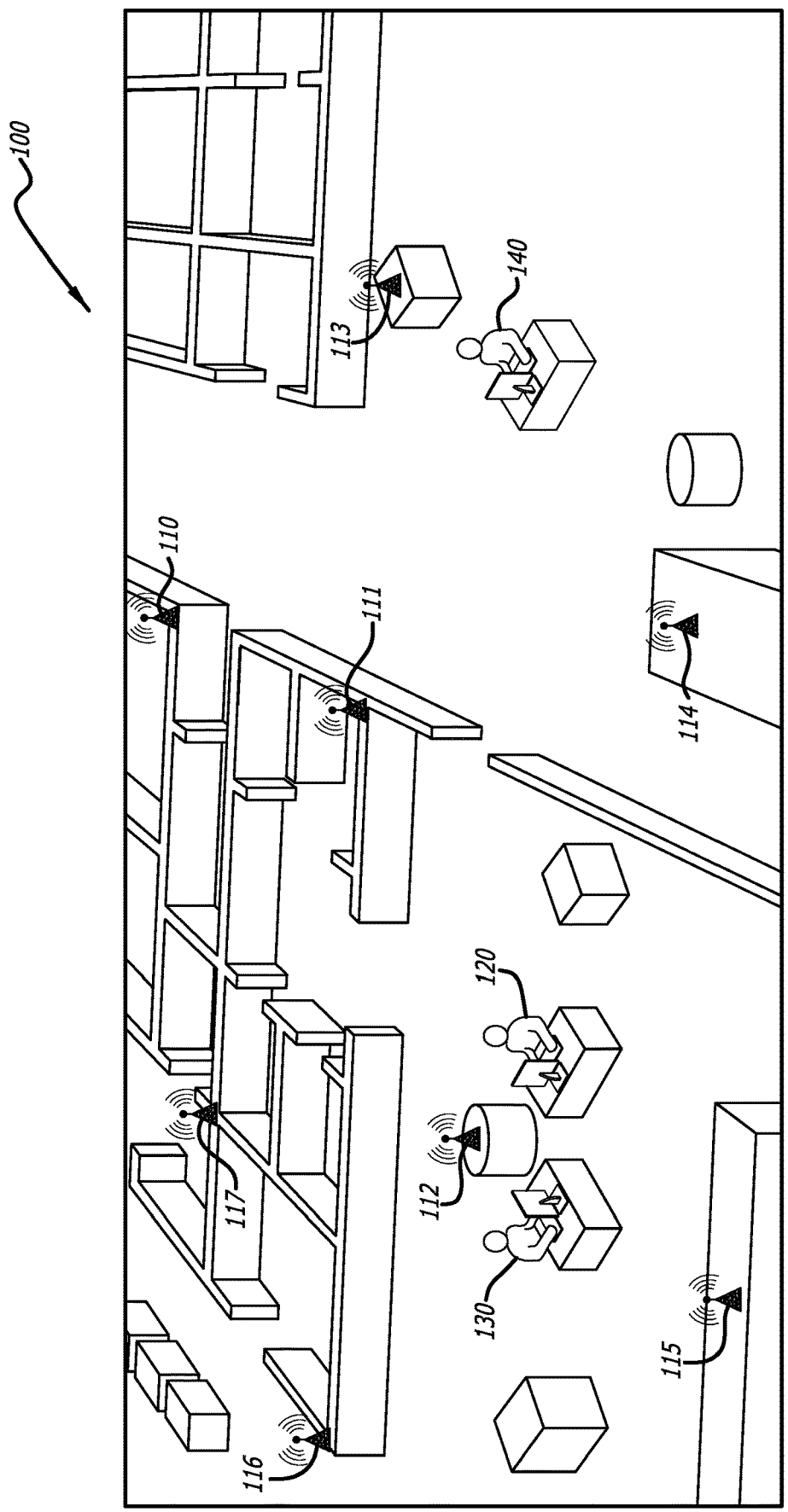
FIG. 1 is a conceptual illustration of a deployment of network devices within a floorplan suitable for management with a sustainable network configuration in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that can manage network devices within a deployment by predicting one or more needs such as, but not limited to, bandwidth capacity, and generating one or more confidence levels for those predictions. These predictions and associated confidence levels can be further utilized to generate a sustainable configuration of the network devices within the floorplan by powering on only devices and/or transceivers that are necessary to provide sufficient coverage for the predicted capacity needs within the desired confidence level. These sustainable configurations can adjust a transceiver or command a device to enter a lower-power mode for example. Based on this, a more optimal coverage area can be created that can provide sufficient network bandwidth capacity while also minimizing the power necessary to operate the coverage area.

These predictions can be made over a series of future time periods. As those skilled in the art will recognize, as the period of time is further into the future, the amount of confidence of those predictions can decrease. Thus, in various embodiments, the predictions can be associated with a number of confidence intervals that can be used or selected as needed based on the level of confidence required. In more embodiments, the latency required to make decisions in the future may be a factor. For example, various embodiments can be associated with a spectrum of methods to generate predictions and confidence intervals. These methods may utilize increasingly complex processes and/or methods that can range from static intervals to dynamic intervals, heuristic rules, autoregressive moving averages, and even one or more machine learning processes. As those skilled in the art will recognize, as the complexity of methods and/or processes increases, the computing power and time needed to generate these results will increase. Thus, when latency is an issue, simpler methods can be utilized. Conversely, when a longer desired latency period is available, the process and/or method can be correlated to a method of prediction of increased complexity.

Various embodiments described herein can extend many current integrations with 3D radio frequency (RF) floorplan projects that integrate real time events which are detectable using one or more radio frequencies. Predictions of where clients should associate next with that information can be generated and utilized to optimize coverage patterns, often with minimal power usage for that pattern. Often, embodiments can aim to ensure minimal RF coverage upon specific floorplans with changing client mixes.

By utilizing these AP signals, a motion sensing network may not be needed within the floorplan, thus saving deployment costs. The APs may be turned on periodically to gauge the current state of the environment and gather data. This can avoid relying on heat sensing as well. Paths can be predicted based on the patterns received by the APs. Predictions can be generated through one or more methods to yield predictions with various confidence levels, which will be discussed in more detail below. In response to new capabilities in 3D spatial modeling of clients, certain embodiments can begin to learn where clients and associated network devices tend to be, and where (and when) they typically never are.

However, by utilizing one or more phased antenna arrays, various embodiments can steer a radio frequency beam via software control. In these embodiments, once it is understood where the clients and associated network devices are active within a floorplan, an RF beam can be focused to that location at a lower transmission power, thereby not wasting energy where it will never be used. Therefore, various embodiments may utilize a combination of adjusting transmission power and dynamic beam steering. This would be particularly useful in outdoor settings such as large public venues, factories, warehouses, etc. The combination of client and associated network device profiles as stationary and/or non-stationary along with the use of phased antenna arrays can be configured to provide compounded savings.

In additional embodiments, a hierarchical set of devices can be considered on which we have APs. Each of these APs can be configured with various transceivers with different capabilities. So, in certain embodiments, a system can account for additional operating powers, such as determining the power or bandwidth needed at a certain point within the floorplan. Depending on the specific deployment, this can be achieved in various ways. In some embodiments, a determination can be made such that a minimum number of APs with a sufficient number of antennas is available. Each AP would obviously be consuming electricity for basic operations and transceiver transmissions. However, different evaluations can be made to provide the sufficient amount of power such that a minimal amount of power is needed to achieve that goal, typically by selecting the most efficient mix of APs in the area that can be configured to provide that sufficient coverage. In certain embodiments, some APs may be determined to be "always on" APs, while others may be configured as "augmentation" APs that supplement the always-on APs.

In many embodiments, there is a desire to achieve a level of "optimal power savings" by reducing the number of operating transceivers within the APs within a floorplan. This can be achieved by enabling and/or disabling the transceivers based on a variety of factors. These factors could be based on the needs/types of the network devices within the deployment/floorplan. For example, some Internet of Things (IoT) devices may not need high data rates but just need connectivity while other connected devices can still get the throughput, they require by utilizing "low data rates" because they may be far from the transceivers that are currently enabled and so on.

Other features that can be integrated within various embodiments of the disclosure include integration with BSS Transition Management (BTM) to pre-force movement of associations of network devices. This can be automatically implied once the "power control scheme" or sustainable configuration kicks in, as it often disables one or more transceivers. In further embodiments, understanding where IoT clients are deployed at night may allow for better transceiver depowering or sustainable configurations. In some embodiments, the system may be configured to force associations for non-moving IoT wireless devices to APs which are scheduled to stay on all night.

When determining a sustainable configuration for the transceivers and other operating components within a floorplan deployment, a useful consideration is often to evaluate the profile of clients, which can include the bandwidth or capacity needs as well as any historical or other data that can provide sufficient inputs for predicting future capacity needs within the floorplan. In further embodiments, network device and/or clients can be characterized into a type of client category, which can, in turn be further utilized to generate a profile. These categories can include, but are not limited to, stationary network devices/clients, which may need specific needs, and can often tolerate a lower bandwidth. These devices can include desktop computers, IoT devices, wireless window blinds, etc. Another category can conversely be non-stationary (i.e., moving) network devices and/or clients. These devices can often be laptop computers, mobile computing devices, wearable devices, etc. The potential usefulness of this is that the stationary category can easily be baselined for seasonality with existing techniques and build the baseline transceiver power needs. In additional embodiments, the non-stationary devices/clients would need more mobility processing and the optimization of the Wi-Fi signaling, which can be achieved through roaming, etc.

It is further contemplated that various embodiments described herein may include getting more granular radio triangulation data from a wireless LAN controller (WLC) and matching this data into available 3D coverage models. In certain embodiments, predictive radio powering for frequently/currently moving client to AP associations can be generated. In more embodiments, coverage patterns or other sustainable configurations can be based on at least a service level agreement (SLA) in order to provide sufficient functionality. Finally, in a number of embodiments, the identity of clients can be based on their associated network device. These identities or classifications may allow for the determination of various needs or data that can be predicted or utilized to generate predictions, such as identifying IoT devices, determining daily or expected client migration patterns, predicting bursts of new clients (such as people with smart phones) entering into a certain area, ensuring that when powering down one or more APs, that certain frequencies or APs won't deallocate during a flow, integrating real-time or near-real-time data with linkages to upcoming virtual meetings or other calendar-based events to get pre-establishing coverage for various associated areas (such as a conference room), and/or to re-allocate clients or network devices across a set of APs within a given floorplan/deployment.

While power states are often thought of as binary states, sleep/awake, there are in reality some in-between states that clearly help with the compromise between reliability (or quality of service) and power efficiency. Various embodiments may have the ability to put an AP/device into some appropriate intermediate states so that a reboot is not necessary upon PoE re-powering. All that is needed is a resumption of PoE power to come up to an ideal state which makes AP/device restoration better than we have today. For example, hibernation mode with periodic neighbor checks or partial shutdown of an AP or a network device, meaning all radios are off, and the AP/network device participates in routing traffic off from it, or the radios be called into an on state via in-band signaling from a peer or sibling AP. To facilitate this profile, corresponding hardware and software features can be turned on or off accordingly.

As those skilled in the art will recognize, there are multiple levels of sleep. In many embodiments, the amount of CPUs/CPU cores, DRAM, or other hardware resources can be powered down when in sleep mode. The cores and DRAM may be able to all be put to sleep, or maybe a single core and DRAM still needs enabled for various activities or network state monitoring, etc. In some cases, a complete shutdown of the AP is necessary, with the caveat that it could take around 5 minutes or more for the AP to complete rebooting. Additional embodiments can help avoid this by configuring the lower-power modes by receiving or requesting data related to sustainable feature capabilities related to lower-power modes.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a deployment of network devices within a floorplan suitable for management with a sustainable network configuration in accordance with various embodiments of the disclosure is shown. In many embodiments, a floorplan 100 can be selected for applying a sustainable network configuration between various access points. Although the floorplan 100 depicted in the embodiment of FIG. 1 is an office environment, it is contemplated that a floorplan may be any environment that includes a plurality of access points distributed throughout an area. In additional embodiments, an area may have multiple floorplans and access points may be associated with multiple floorplans. Indeed, in certain embodiments, a floorplan may be defined as a collection of access points and the area that those access points cover.

In the embodiment depicted in FIG. 1, the floorplan 100 has a first access point 110 at an entranceway to the area. Likewise, a second access point 111 can be placed centrally within the floorplan 100. Within the floorplan 100, three people are depicted working at desk workstations. The first person 120 and second person 130 are working next to a third access point 112. A third person 140 is working next to a fourth access point 113. Additional access points are distributed throughout the floorplan 100 to provide additional wireless signal coverage including a fifth access point 114, a sixth access point 115, a seventh access point 116, and an eighth access point 117.

Traditionally, all access points may be fully powered and operating throughout the day. However, within the embodiment of FIG. 1, the first person 120 and second person 130 may be fully served by the third access point 112. Similarly, the third person 140 may be fully served by the connection provided by the fourth access point 113. Therefore, as described in more detail below, a number of access points may be selectively powered down, de-energized into a lower-power mode, or have one or more transceivers adjusted or turned off. This powering down may include powering down the entire unit to a sleep mode but may also include powering down or adjusting one or more transceivers within the access point. In a number of embodiments, the access points can be configured with multiple transceivers that are configured for different bands of usage. These bands of usage may be a higher-frequency band, or a lower-frequency band. The higher-frequency band may provide enhanced signal readings and data transfer throughput, but often require additional energy to operate at a similar range compared to a transceiver configured for use on a lower-frequency band.

Powering down access points and/or their transceivers can provide significant savings in overall electricity usage within the floorplan 100. However, powering down these elements within a network can cause problems when additional traffic suddenly enters the floorplan 100. For example, additional people may walk into the floorplan 100 from an outside area. If the first access point 110 was powered down into a sleep mode or has one or more transceivers turned off or configured in a certain manner, there may be situations where the time it takes to wake from the sleep mode or repower and/or reconfigure a transceiver is too long to provide adequate coverage and/or service to the additional people. This can negatively affect service level agreements (SLAs) as well as the overall user experience. Thus, in a variety of embodiments, any powering down within the floorplan 100 should be weighed against the time it may take to sufficiently satisfy a sudden increase in network traffic against the amount of time that may be needed to reboot or bring back online the network devices that are in a lower-power mode.

As a result, in the embodiment depicted in FIG. 1, a potential minimal energization configuration (i.e., sustainable network configuration) may be generated by a device, controller, or other logic, such as a network capacity prediction logic, to include operating the first access point 110 at a lower-power setting (e.g., powering down one or more transceivers) until it detects additional people entering the floorplan 100, which can trigger a higher-power setting based on the capabilities of that device. However, the second access point 111 may be powered off into a full sleep mode because the third access point 112 is sufficiently serving the first person 120 and second person 130 while the fourth access point 113 is also sufficiently serving the third person 140. Therefore, the third access point 112 and the fourth access point 113 may be operating at full and normal capacity or within a lower-power capacity that can sufficiently provide bandwidth capacity to the clients utilized by the third person 140. The fifth access point 114, sixth access point 115, seventh access point 116, and eighth access point 117 may also power down into a lower-power mode until one or more triggering events occurs to initiate the generation or update of a sustainable network configuration associated with the devices to hand off or re-associate clients during power up of the devices within the floorplan 100.

Although a specific embodiment for a conceptual illustration of a deployment of network devices within a floorplan suitable for management with a sustainable network configuration suitable for carrying out the various steps, processes, methods, and operations described herein is discussed with respect to FIG. 1, any of a variety of systems and/or processes may be utilized in accordance with embodiments of the disclosure. For example, the device, controller, or logic may be a specialized device within the network or operated by a network administrator remotely from the deployed environment. In certain embodiments, the device, controller, or logic may be a logic that is operated or distributed through the access points of the network. The elements depicted in FIG. 1 may also be interchangeable with other elements of FIGS. 2A-9 as required to realize a particularly desired embodiment.

Figure 2B:
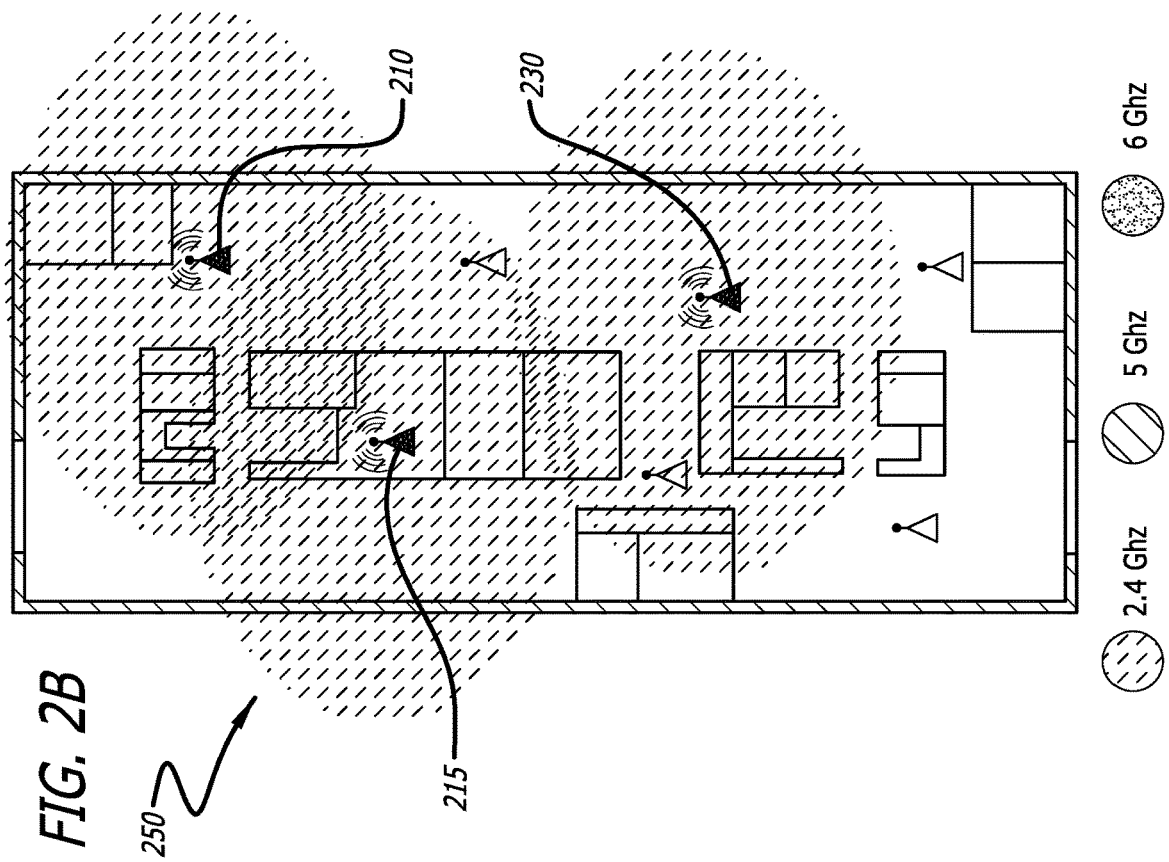
FIG. 2B is a schematic diagram of a floorplan with a plurality of network devices with a sustainable network configuration applied in accordance with various embodiments of the disclosure.
Figure 2A:
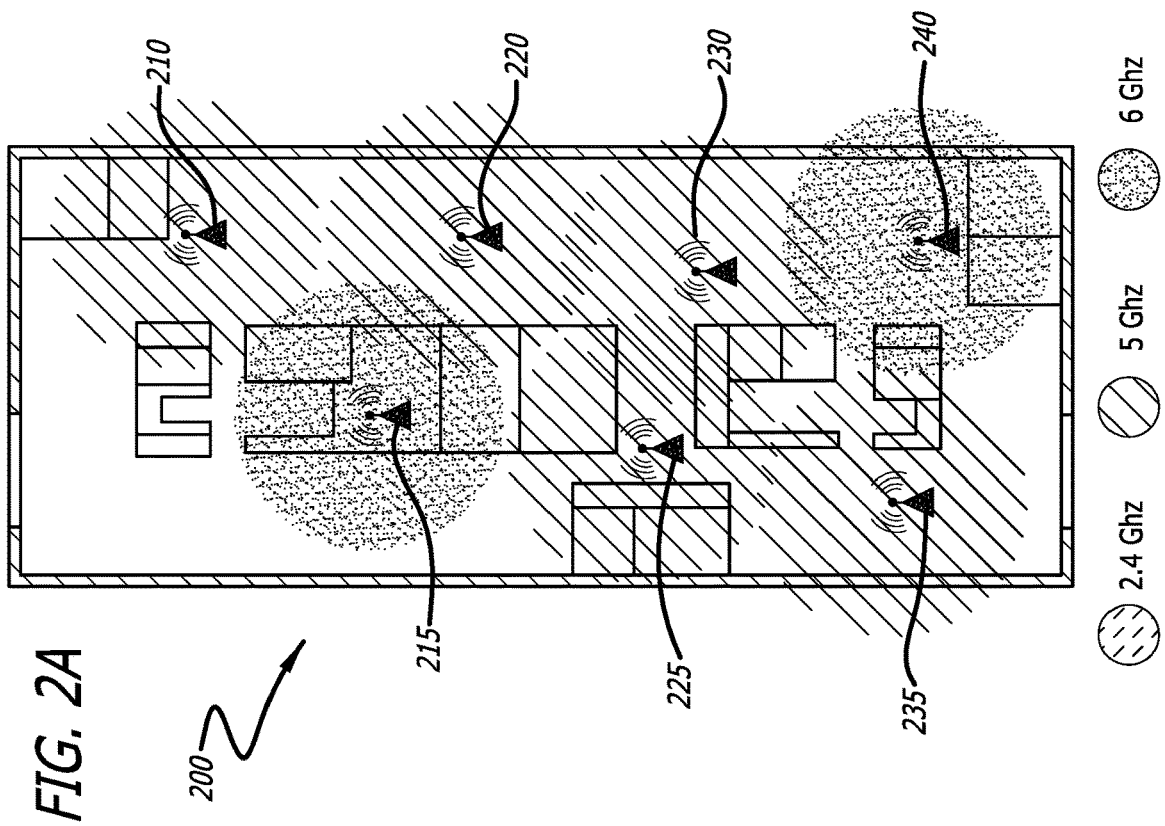
FIG. 2A is a schematic diagram of a floorplan with a plurality of network devices during normal operation in accordance with various embodiments of the disclosure.

Referring to FIG. 2A, a schematic diagram of a floorplan with a plurality of network devices during normal operation in accordance with various embodiments of the disclosure is shown. Similar to the embodiments depicted in FIG. 1, a floorplan 200 can be configured with different access points to provide wireless network coverage over a large area within the floorplan. In additional embodiments, those APs may be further configured to provide network coverage at various frequency bands. These frequency bands can often be generated by utilizing a specialized transceiver that is configured to transmit and/or receive wireless network signals at a particular frequency band. In various embodiments, the frequency bands may include 2.4 GHz, 5 GHZ, and/or 6 GHz signals. However, it is contemplated that any frequency band may be utilized as necessary to allow for the transmission of wireless networking signals. In some embodiments, the transceivers may be configured to transmit over multiple frequency bands or may be tuned to direct signals to a portion of the floorplan 200.

In the embodiment depicted in FIG. 2A, the floorplan 200 is configured with a first access point 210, a second access point 215, a third access point 220, a fourth access point 225, a fifth access point 230, a sixth access point 235, and a seventh access point 240. In the depicted embodiment, the first access point 210, third access point 220, fourth access point 225, fifth access point 230 and sixth access point 235 are each transmitting a 5 GHz wireless signal. Additionally, the second access point 215 and seventh access point 240 are transmitting wireless signals at a 6 GHz frequency band. However, during periods of low traffic/bandwidth usage, or when only a few to no people are present within the floorplan 200, this configuration may be inefficient, and one or more access points may be put into a lower-power mode.

Thus, there may be a desire to power down or initiate a lower-power mode not only one or more APs within the floorplan 200, but to also power down one or more transceivers/antennas configured with different frequency bands. Similar to the embodiments described above with respect to FIG. 1, a network capacity prediction logic or similar management tool may be configured to gather relevant data and orchestrate various lower-power modes and re-associating clients afterwards to all APs associated with the floorplan to achieve a lower-energy-using state with increased client usage reliability. However, based on one or more current or future events or after a predetermined amount of time, a reassessment may occur to determine if the lower-power mode orchestration needs to be adjusted. In certain embodiments, event-based data or other client management data may be parsed or otherwise mined to predict when a change in usage or client needs may occur, which could trigger a reassessment of the necessary lower-power mode orchestration necessary to provide sufficient coverage and service levels to users while minimizing the transceivers and/or APs necessary to provide said coverage, including powering on one or more frequency band transceivers within one or more APs.

Referring to FIG. 2B is a schematic diagram of a floorplan with a plurality of network devices with a sustainable network configuration applied in accordance with various embodiments of the disclosure is shown. In many embodiments, the floorplan 250 depicted in FIG. 2B is similar to the floorplan 200 of FIG. 2A but has one or more devices and/or transceivers operating in a lower-power and/or powered off. This sustainable network configuration in FIG. 2B results in the first access point 210, second access point 215, and fifth access point 230 remaining active (with a reduced number of transceivers) while the remaining APs are powered down.

Additionally, within the first access point 210, second access point 215, and fifth access point 230, the respective 5 GHz and 6 GHz transceivers have been powered down. As a result, only the 2.4 GHz transceivers are active within the embodiment of FIG. 2B. In these embodiments, the sustainable network configuration can be designed to provide coverage over a majority of the floorplan 250 with just the 2.4 GHz signal. Thus, the selection of active APs can be spread out of the floorplan 250. In this configuration, a user with a client device may still be able to connect to the wireless network at most any location within the floorplan 250. However, if it is detected that more users may be predicted to enter the floorplan 250 or that a client on a network device may require increased bandwidth capacity, additional frequency bands, transceivers, and/or APs may be powered on to continue providing a sufficient user experience and handoff based on the available network device capabilities.

Although specific embodiments are described above with respect to FIGS. 2A and 2B, any of a variety of systems and/or processes may be utilized in accordance with embodiments of the disclosure. For example, the access points may be directed to exit lower-power modes in response to a predefined schedule or when historical data or seasonal patterns indicate that increased usage is likely to occur. The aspects described in FIGS. 2A and 2B may also be interchangeable with other elements of FIGS. 1 and 3-9 as required to realize a particularly desired embodiment.

Figure 3:
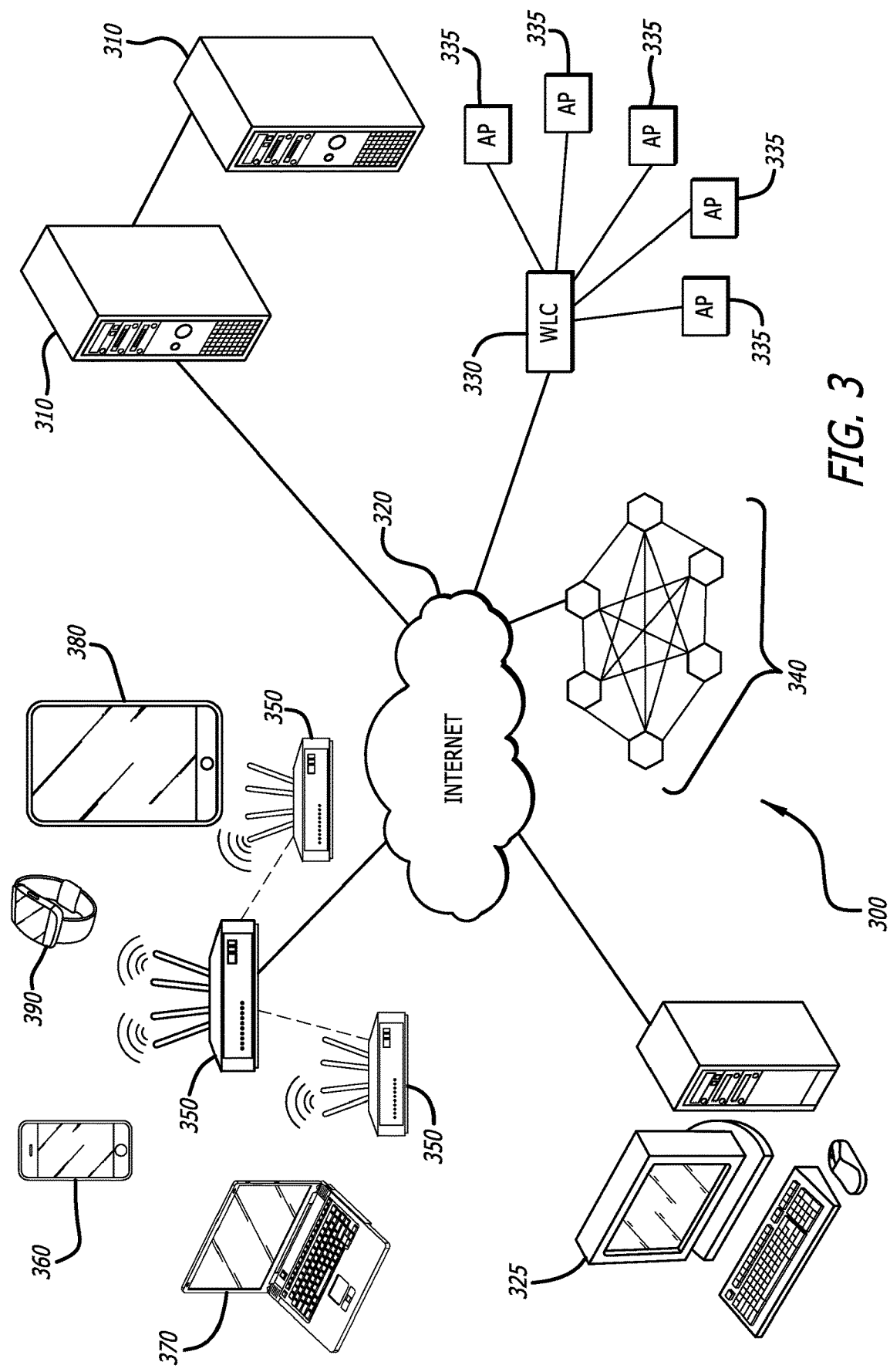
FIG. 3 is a conceptual network diagram of a various environments that a network capacity prediction logic may operate on a plurality of network devices in accordance with various embodiments of the disclosure.

Referring to FIG. 3, a conceptual network diagram of a various environments that a network capacity prediction logic may operate on a plurality of network devices in accordance with various embodiments of the disclosure is shown. Those skilled in the art will recognize that a network capacity prediction logic can be comprised of various hardware and/or software deployments and can be configured in a variety of ways. In some non-limiting examples, the network capacity prediction logic can be configured as a standalone device, exist as a logic within another network device, be distributed among various network devices operating in tandem, or remotely operated as part of a cloud-based network management tool.

In many embodiments, the network 300 may comprise a plurality of devices that are configured to transmit and receive data for a plurality of clients. In various embodiments, cloud-based network management servers 310 are connected to a wide-area network such as, for example, the Internet 320. In further embodiments, cloud-based network management servers 310 can be configured with or otherwise operate a network capacity prediction logic. The network capacity prediction logic can be provided as a cloud-based service that can service remote networks, such as, but not limited to the deployed network 340. In these embodiments, the network capacity prediction logic can be a logic that receives data from the deployed network 340 and generates predictions, confidence levels, and perhaps automates certain decisions associated with the network devices. In certain embodiments, the network capacity prediction logic can generate historical and/or algorithmic data in various embodiments and transmit that back to one or more network devices within the deployed network 340.

However, in additional embodiments, the network capacity prediction logic may be operated as distributed logic across multiple network devices. In the embodiment depicted in FIG. 3, a plurality of network access points (APs) 350 can operate as a network capacity prediction logic in a distributed manner or may have one specific device facilitate the generation of predictions and confidence levels for the various APs. This can be done to provide sufficient needs to the network of APs such that, for example, a minimum bandwidth capacity may be available to various devices. These devices may include but are not limited to mobile computing devices including laptop computers 370, cellular phones 360, portable tablet computers 380 and wearable computing devices 390.

In still further embodiments, the network capacity prediction logic may be integrated within another network device. In the embodiment depicted in FIG. 3, the wireless LAN controller 330 may have an integrated network capacity prediction logic that it can use to generate predictions, confidence levels, and perhaps automated decisions regarding the various APs 335 that it is connected to, either wired or wirelessly. In this way, the APs 335 can be configured with a sustainable network configuration based on the configurations generated by and sent from the WLC 330. In still more embodiments, a personal computer 325 may be utilized to access and/or manage various aspects of the network capacity prediction logic, either remotely or within the network itself. In the embodiment depicted in FIG. 3, the personal computer 325 communicates over the Internet 320 and can access the network capacity prediction logic within the network management servers 310, the network APs 350, or the WLC 330 to modify or otherwise monitor the network capacity prediction logic.

Although a specific embodiment for a conceptual network diagram of a various environments that a network capacity prediction logic may operate on a plurality of network devices suitable for carrying out the various steps, processes, methods, and operations described herein is discussed with respect to FIG. 3, any of a variety of systems and/or processes may be utilized in accordance with embodiments of the disclosure. For example, the network capacity prediction logic may be implemented across a variety of the systems described herein such that some predictions are generated a first system type (e.g., remotely), while the confidence levels are generated in a second system type (e.g., locally). The elements depicted in FIG. 3 may also be interchangeable with other elements of FIGS. 2B-9 as required to realize a particularly desired embodiment.

Figure 4:
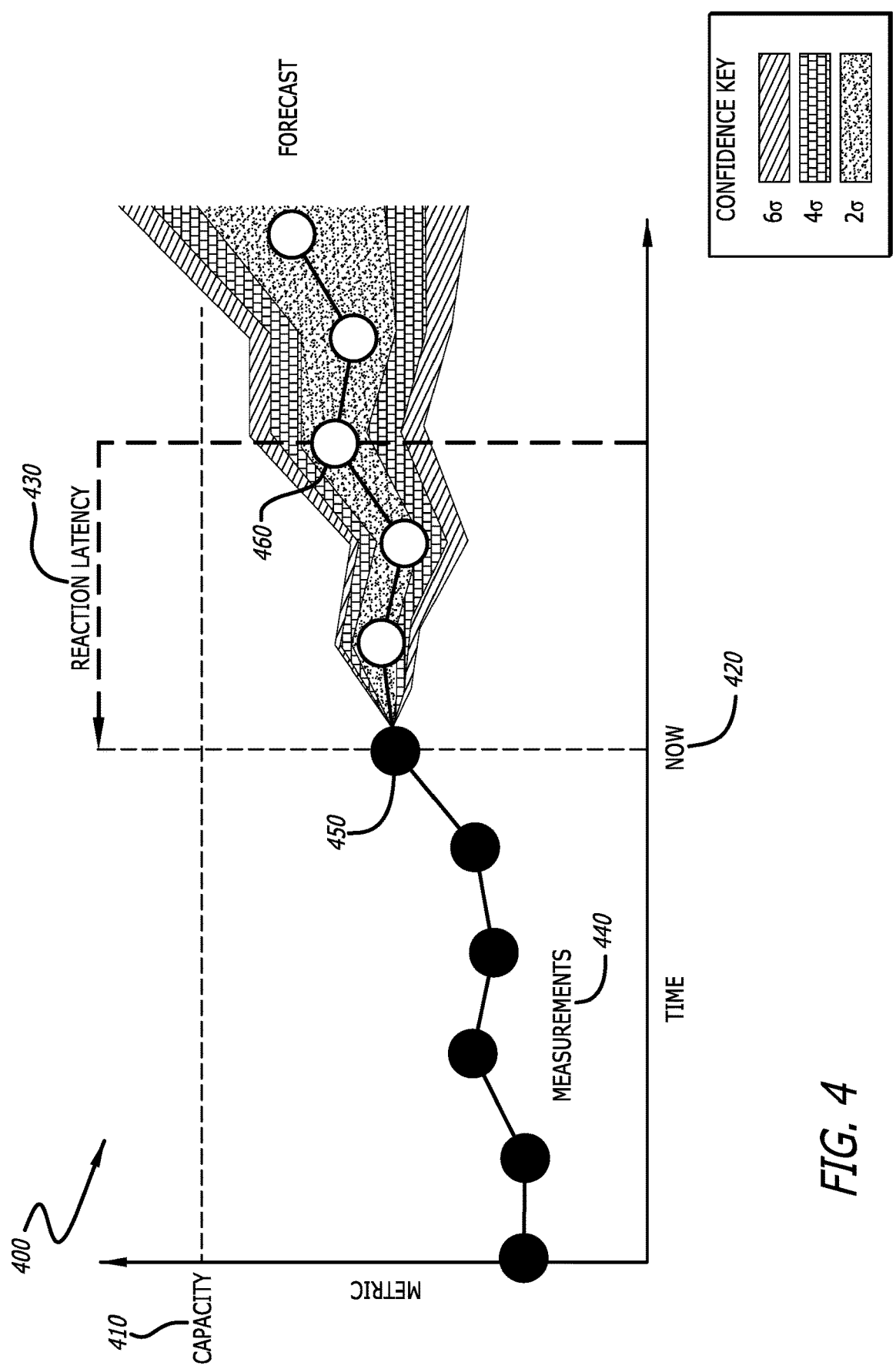
FIG. 4 is a conceptual graph depicting the relationship between bandwidth capacity needs over time and the predicted future needs and generated confidence levels in accordance with various embodiments of the disclosure.

Referring to FIG. 4, a conceptual graph 400 depicting the relationship between bandwidth capacity needs over time and the predicted future needs and generated confidence levels in accordance with various embodiments of the disclosure is shown. As the graph 400 depicts in the embodiment shown in FIG. 4, a series of measurements 440 can be measured over time (x-axis). The measurements 440 can be of a certain metric (y-axis). In the embodiment depicted in FIG. 4, the metric shown is the network bandwidth capacity 410 (shown as "capacity") which indicates the current overall network capacity.

During operation, a current time 420 (shown as "now") has a known measured value 450. This is preceded by the previous series of measurements 440. However, it is desired to predict the future values that may be associated with the metric. Thus, a forecast can be generated. Specifically, a series of points in time of the future can be predicted along with a series of associated confidence levels. Each of these confidence levels can comprise one or more confidence intervals which can indicate the general level of confidence. As those skilled in the art will recognize, the farther out in time the prediction, the less confidence (and wider confidence intervals) is present in that prediction. Thus, the embodiment depicted in FIG. 4 shows three levels of confidence intervals with different sigma levels (i.e., standard error/deviation, etc.).

As will be described in more detail below, the selection of a prediction or metric value within the forecast can be based on the reaction latency 430. In other words, the longer the latency, the farther out in the future the predictions can look. Conversely, if the latency is low and the prediction is needed soon, the prediction should then be made at a point in time in the near future within the window of reaction latency 430. Therefore, in the embodiment depicted in FIG. 4, the third prediction 460 is selected based on the reaction latency 430 which is based on the current measured value 450. As time moves on, this "window" moves forward in time, however, based on various events, that reaction latency 430 may increase or decrease, which can allow for different predictions to be desired, thus validating the generation of multiple predictions and confidence levels over time, not just a fixed period out within the forecast.

As those skilled in the art will recognize, there are a large number of methods to generate these predictions and confidence intervals, each of varying complexity. These may include, but are not limited to, static intervals to dynamic intervals, heuristic rules, autoregressive moving averages, and even one or more machine learning processes. In response to the generated predictions and based on a number of factors related to network administration, the network capacity 410 can be increased or decreased through the use of a generated sustainable network configuration that can be transmitted or otherwise passed to the network devices within the network.

Although a specific embodiment for a conceptual graph depicting the relationship between bandwidth capacity needs over time and the predicted future needs and generated confidence levels suitable for carrying out the various steps, processes, methods, and operations described herein is discussed with respect to FIG. 4, any of a variety of systems and/or processes may be utilized in accordance with embodiments of the disclosure. For example, the graph 400 is provided as an illustrated example to convey the concepts described herein and may not be implemented exactly as described. The elements depicted in FIG. 4 may also be interchangeable with other elements of FIGS. 1-3 and 5-9 as required to realize a particularly desired embodiment.

Figure 5:
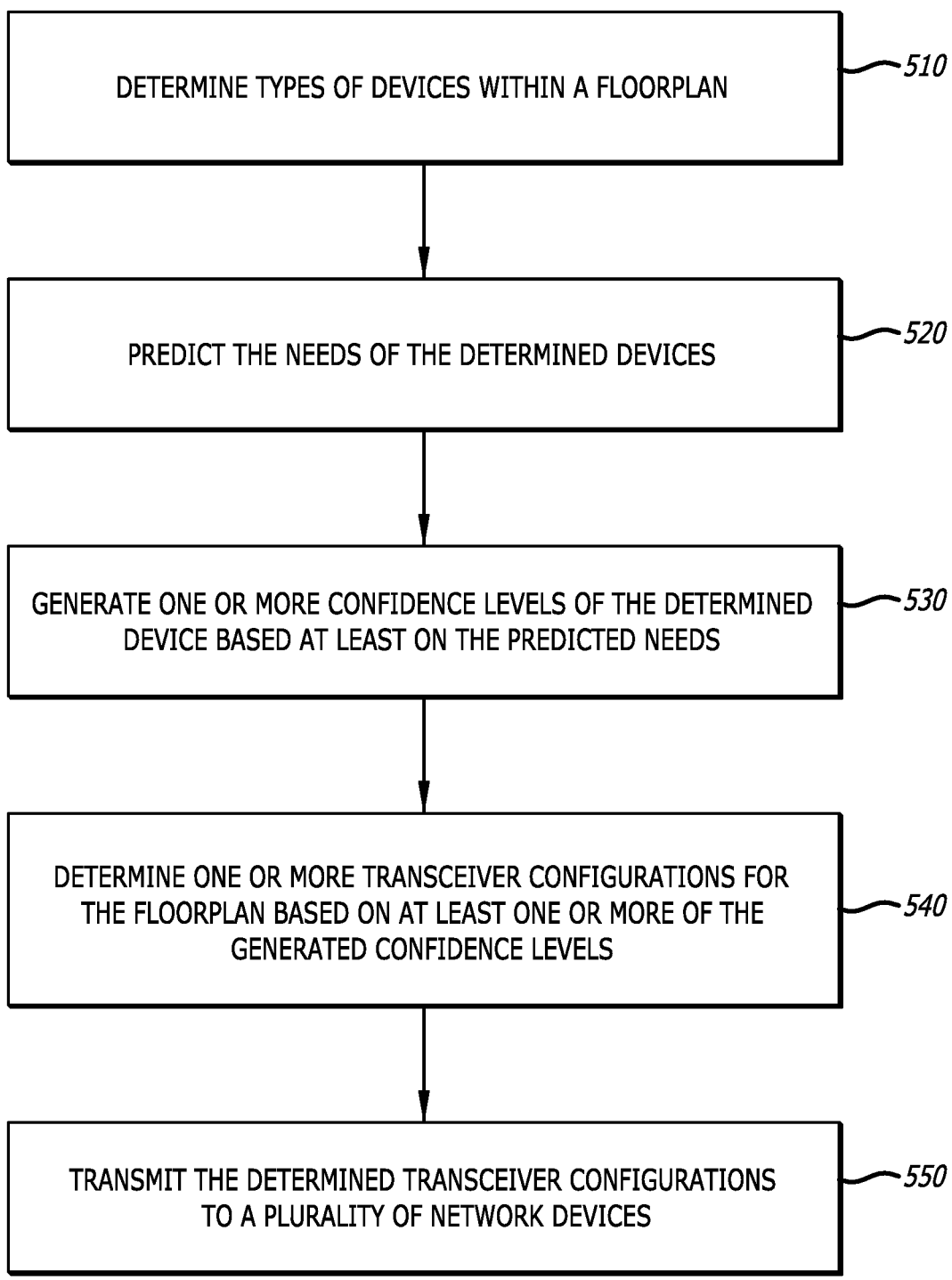
FIG. 5 is a flowchart depicting a process for managing a network through predicted needs and generated confidence levels in accordance with various embodiments of the disclosure.

Referring to FIG. 5, a flowchart depicting a process 500 for managing a network through predicted needs and generated confidence levels in accordance with various embodiments of the disclosure is shown. In many embodiments, the process 500 can determine types of devices within a floorplan (block 510). In certain embodiments, the determination can be done by parsing topology data that can be received from one or more network devices. The devices can transmit this data or can broadcast it across the network. The topology data may also include data related to various capabilities of the devices such as available lower-power modes, or transceiver capabilities.

In additional embodiments, the process 500 can predict the needs of the determined devices (block 520). In some embodiments, the needs can include client bandwidth capacity. However, in additional embodiments, the needs can include other items such as, but not limited to, service level agreements (SLAs), connection uptime, power requirements, reliability, etc. The prediction can be carried out by various methods depending on one or more requirements. As described in more detail with respect to FIG. 4 and below with respect to FIGS. 7 and 8, the various methods can include thresholds to one or more machine-learning processes, with increasing levels of complexity. This complexity can vary the type and detail for the prediction that can be generated. The predictions may also be done in a series of time periods in the future.

In a number of embodiments, the process 500 can generate one or more confidence levels of the determined device based on at least on the predicted needs (block 530). While any prediction can be made in a point of time in the future regarding one or more needs, the ability to rely on this data may be limited without an associated confidence level. As those skilled in the art will recognize, confidence levels can be generated through various methods. The ability to generate these confidence levels may also require various levels of complexity which can similarly be determined based on the available computational resources or the required latency of the process/system.

In still more embodiments, the process 500 can determine one or more transceiver configurations for the floorplan based on at least one or more of the generated confidence levels (block 540). In further embodiments, the process 500 can have the predictions and/or confidence levels can be utilized to predict a given bandwidth capacity for a given time in the future. Thus, to provide that predicted coverage, the network devices within the floorplan can be configured such that the available transceivers or devices can be powered off or on to provide more optimal and sustainably coverage for the floorplan.

In various embodiments, the process 500 can transmit the determined transceiver configurations to a plurality of network devices (block 550). The transmitted configurations can be part of a sustainable network configuration that can create a more optimal and sustainable configuration for the floorplan. The transmission can be directly transmitted to the necessary network devices or may be broadcast out to all devices within a network. In still additional embodiments, the process 500 can receive a signal back from the network devices confirming the new configurations have been applied.

Although a specific embodiment for managing a network through predicted needs and generated confidence levels suitable for carrying out the various steps, processes, methods, and operations described herein is discussed with respect to FIG. 5, any of a variety of systems and/or processes may be utilized in accordance with embodiments of the disclosure. For example, the process may be done by an AP, switch, router, or other network device. The elements depicted in FIG. 5 may also be interchangeable with other elements of FIGS. 1-4 and 6-9 as required to realize a particularly desired embodiment.

Figure 6:
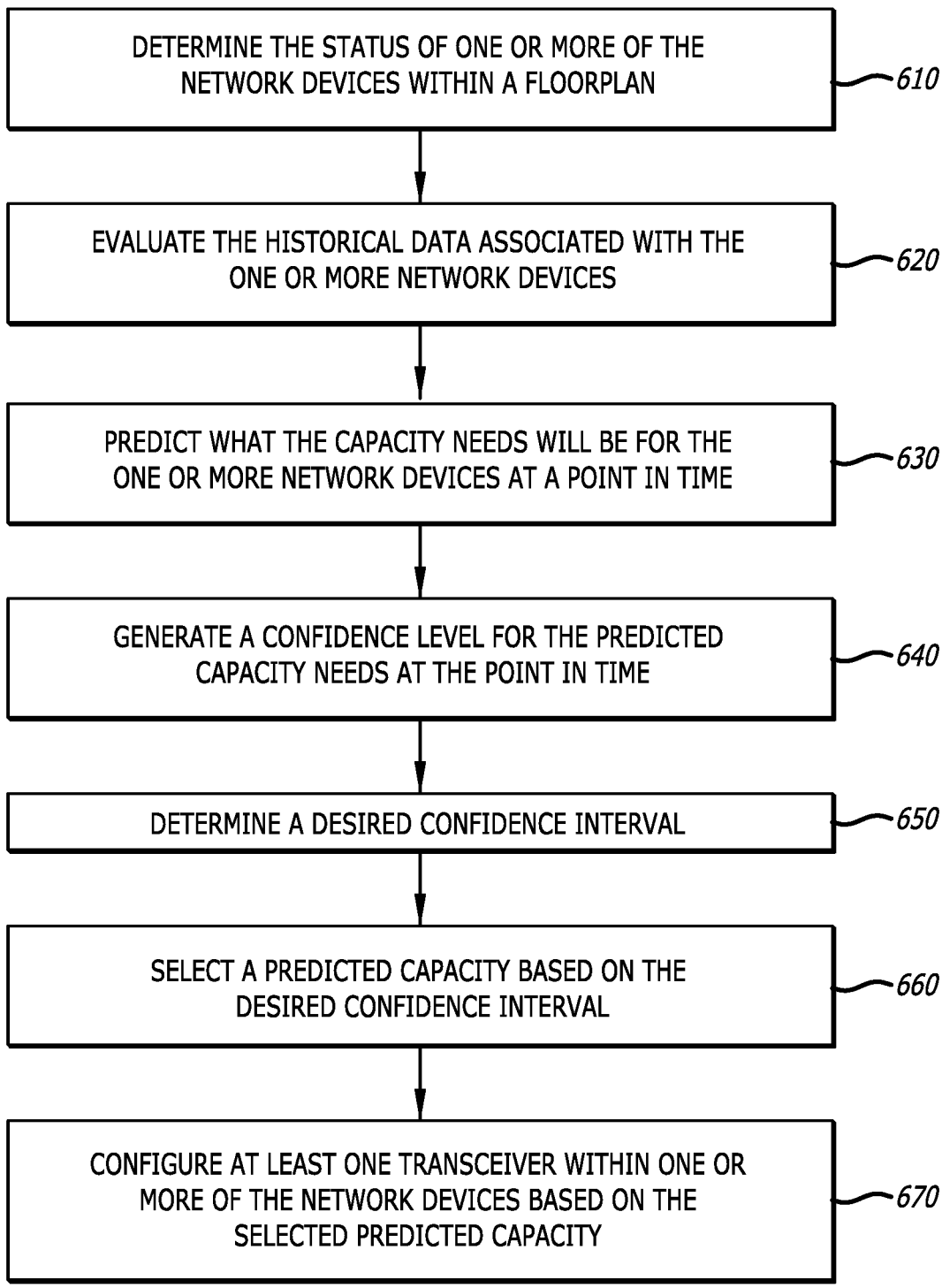
FIG. 6 is a flowchart depicting a more detailed process of managing a network through predicted needs and generated confidence levels in accordance with various embodiments of the disclosure.

Referring to FIG. 6, a flowchart depicting a more detailed process 600 of managing a network through predicted needs and generated confidence levels in accordance with various embodiments of the disclosure is shown. In many embodiments, the process 600 can determine the status of one or more of the network devices within a floorplan (block 610). In these embodiments, the status of the network devices can be associated with what the current power configurations are, or what the transceiver settings are, etc. The determination can be received from a broadcast from the network devices or may be received from a direct communication method.

In additional embodiments, the process 600 can evaluate the historical data associated with the one or more network devices (block 620). Historical data can be configured to include various items such as past need levels, client connection histories, as well as previously determined paths for those client connections. In some embodiments, each non-stationary client may be determined to follow one or more of a limited number of determined paths within the floorplan, which can indicate seasonality but also provide insight into predictions on where the client may need to be handed off to another AP or even pre-moved. For example, a mobile computing device like a smart phone can be held by a person walking through a typical path on a floorplan to go from one area to another. The limited number of paths within an office floorplan may indicate where that client may be moving toward. In some embodiments, external data, such as calendaring data can be accessed or stored in historical data to inform of patterns or paths that the client may take.

In a number of embodiments, the process 700 can predict what the capacity needs will be for the one or more network devices at a point in time (block 630). Often, the point in time will be at one or more points in time in the future, which can be in a series of predictions at particular intervals. In certain embodiments, the required latency or speed at which the data is needed may dictate what the intervals of time will be, or the number of predictions made.

In more embodiments, the process 600 can generate a confidence level for the predicted capacity needs at the point in time (block 640). In various embodiments, each of the predicted needs will have a corresponding level or levels of confidence associated with it. This confidence level can be generated by a number of means by the process 600 but can be configured in basic standard deviations as those skilled in the art will recognize.

In further embodiments, the process 600 can determine a desired confidence interval (block 650). Based on the characteristics of the network administration, the amount of confidence needed in the predicted capacity can vary. For example, if maximum sustainability is desired, then a first level of confidence may be desired, while if maintaining network capacity at all costs is the priority, then selecting a prediction at a second level of confidence may be needed.

In still more embodiments, the process 600 can select a predicted capacity based on the desired confidence level (block 660). As described above, each prediction can have a variety of confidence levels associated with it. Thus, a prediction can be selected based on the overall confidence. However, in some embodiments, the predicted needs (such as capacity) may be selected based on the point in time in the future it is. This can be due to a low latency demand or can be to ensure that a high level of confidence is obtained.

In a variety of embodiments, the process 600 can configured at least one transceiver within one or more of the network devices based on the selected predicted capacity (block 670). As discussed above, the selected prediction can be utilized to generate and transmit a sustainable network configuration to the network devices it applies to within the network. These configurations may include settings that adjust transceiver settings or require that one or more transceivers or network devices as a whole to enter a lower-power mode or de-energize entirely. This can be done to ensure viable network coverage while reducing the overall electricity usage within the network associated with the floorplan.

Although a specific embodiment for a more detailed process of managing a network through predicted needs and generated confidence levels suitable for carrying out the various steps, processes, methods, and operations described herein is discussed with respect to FIG. 6, any of a variety of systems and/or processes may be utilized in accordance with embodiments of the disclosure. For example, the process can evaluate the hardware capabilities or latency speed settings of the network devices and transceivers to further generate sustainable configurations. The elements depicted in FIG. 6 may also be interchangeable with other elements of FIGS. 1-5 and 7-9 as required to realize a particularly desired embodiment.

Figure 7:
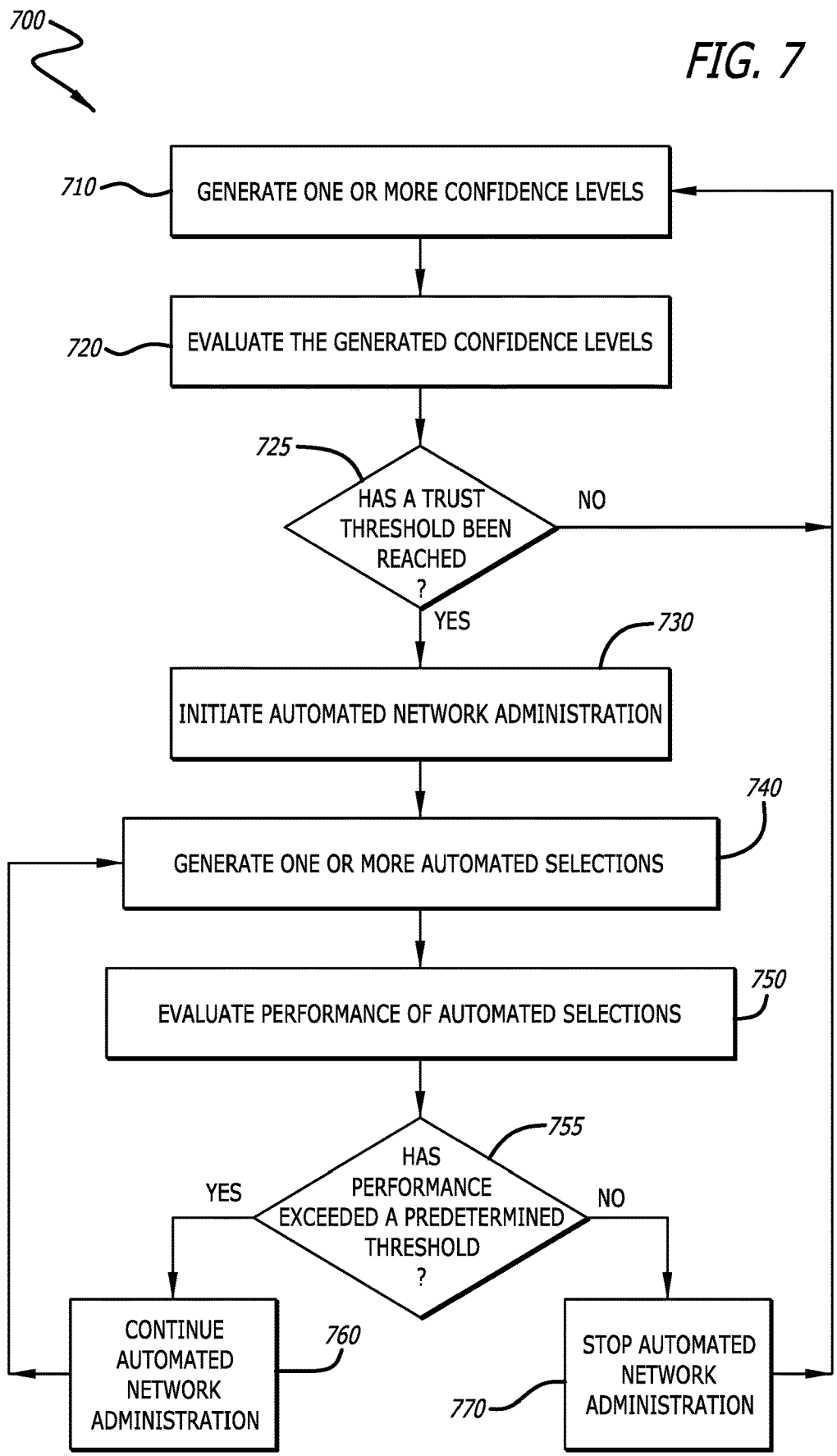
FIG. 7 is a flowchart depicting a process for establishing automated network administration based on generated confidence intervals in accordance with various embodiments of the disclosure.

Referring to FIG. 7, a flowchart depicting a process 700 for establishing automated network administration based on generated confidence intervals in accordance with various embodiments of the disclosure is shown. In many embodiments, the process 700 can generate one or more confidence levels (block 710). As discussed above, and shown in the embodiment depicted in FIG. 4, various confidence levels can be associated with each prediction generated at a point in time or over a series of points of time in the future.

In a number of embodiments, the process 700 can evaluate the generated confidence levels (block 720). This evaluation can be done after the period of time has occurred. As such, the evaluation can be to compare the predicted needs with the actual needs. For example, if the needs are related to the overall network bandwidth capacity, then the predicted value can be compared to the actual capacity needed during that time. This difference or delta can be utilized to generate a level of trust over time.

In various embodiments, the process 700 can determined if a trust threshold has been reached (block 725). A trust value can be generated in a number of ways, and a threshold to determine if a sufficient level of trust has been reached can, for example, vary depending on the network administration strategy, or the type of network being administrated, etc. Often, the trust threshold will be very high to ensure that predicted values are within a smaller margin of error of the actual results. When a trust threshold has not been reached, the process 700 can against generate one or more confidence levels again (block 710).

However, when the trust threshold has been reached, the process 700 can initiate an automated network administration (block 730). In these instances, the network administrator may be allowed to step away or otherwise stop monitoring the needs of the network and allow the predictions to be utilized to make decisions on network device configurations. Subsequently, a number of newer predictions and confidence levels can be generated.

In additional embodiments, the process 700 can generate one or more automated selections (block 740). These selections can be similar to what a network administrator would do. However, these automated selections are selecting the needs of the network based on the predicted needs and their associated confidence levels.

In more embodiments, the process 700 can evaluate the performance of the automated selections (block 750). As the point in time that is associated with the automated selection comes to pass, the actual needs of the network can be compared against the predicted needs. Again, the difference or delta can be utilized to generate a performance value that can be used to gauge if the automated system is completing its tasks sufficiently.

In further embodiments, the process 700 can determine if the performance value has exceeded a particular threshold (block 755). This performance value can be compared against a threshold for minimum automated network administration performance. As those skilled in the art will recognize, an automated system will only be desired if it is performing within an acceptable level. Thus, if it is determined that the performance threshold is not being met, then the process 700 can stop the automated network administration (block 770). This can be done automatically in some embodiments or may be configured to send out a notification to the network administrator that manual control is now needed. The process 700 can then once again generate one or more confidence levels for network administrator review (block 710).

However, when the performance threshold is being met, then the process 700 can continue operating the automated network administration (block 760). As such, the process 700 will then continue to generate one or more automated selections (block 740). This process can continue over time until a predetermined amount of time has expired, one or more triggering events occur, or when a network administrator indicates that manual control is again desired.

Although a specific embodiment for establishing automated network administration based on generated confidence intervals suitable for carrying out the various steps, processes, methods, and operations described herein is discussed with respect to FIG. 7, any of a variety of systems and/or processes may be utilized in accordance with embodiments of the disclosure. For example, the automation may be done on sight by a specific device, or may be generated remotely through a cloud-based network administration software suite. The elements depicted in FIG. 7 may also be interchangeable with other elements of FIGS. 1-6 and 8-9 as required to realize a particularly desired embodiment.

Figure 8:
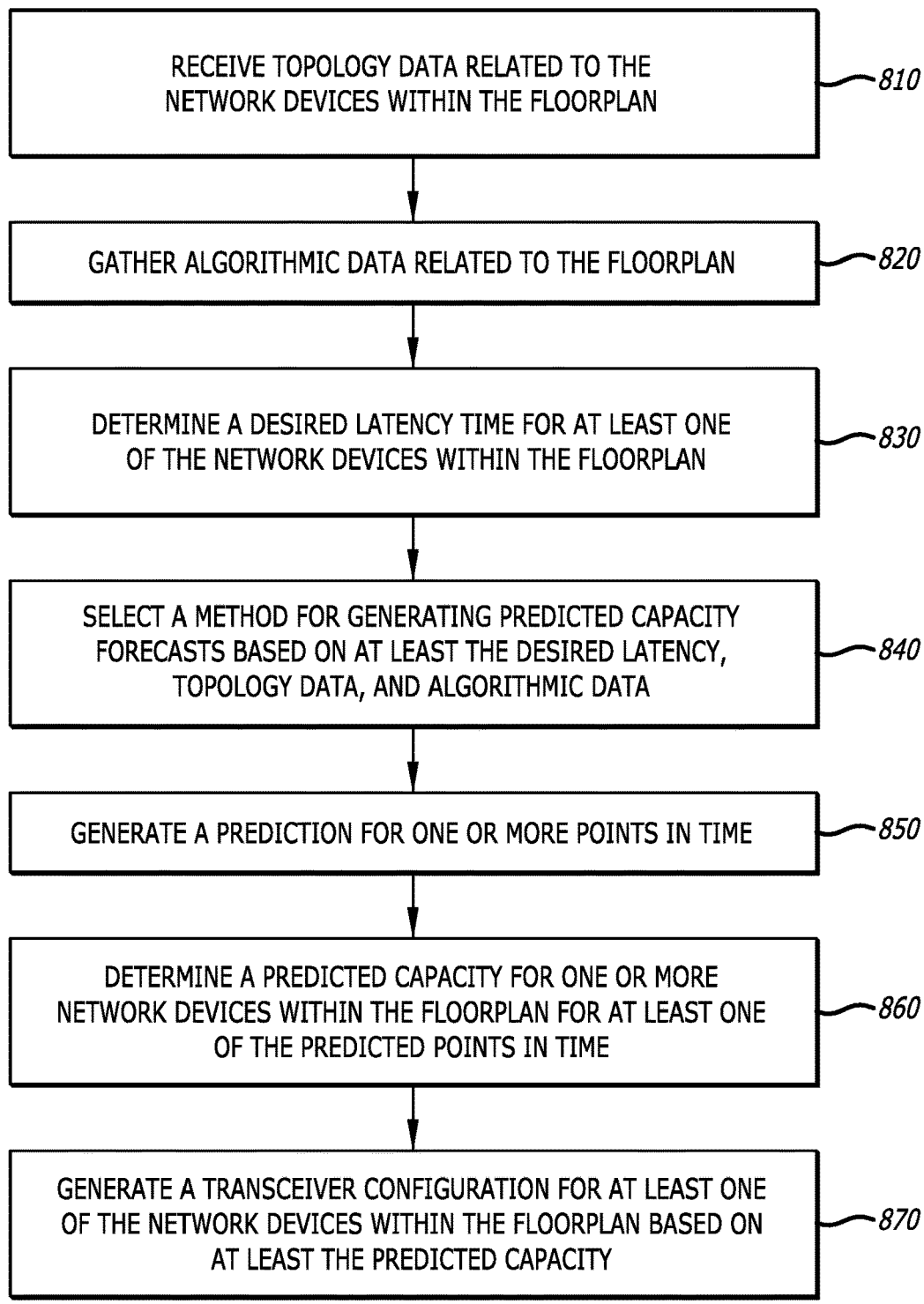
FIG. 8 is a flowchart depicting a process for managing a network based on a desired latency associated with the generated predictions in accordance with various embodiments of the disclosure.

Referring to FIG. 8, a flowchart depicting a process 800 for managing a network based on a desired latency associated with the generated predictions in accordance with various embodiments of the disclosure is shown. As discussed above, the ability to generate predictions and confidence levels can vary depending on one or more factors. Multiple options for generating this data can exist, each with different levels of required computation resources or time required to complete. These different options can be configured with an increasing level of complexity. The desired latency time can thus have a large impact on the type of process utilized to generate the predictions and confidence levels.

In many embodiments, the process 800 can receive topology data related to the network devices within a floorplan (block 810). As discussed above, the topology data can include not only the network devices and network traffic data associated within but may also include details about the hardware configuration and/or capabilities of the network devices within the floorplan. This can allow for more specific configurations based on various lower-power mode settings, or transceiver capabilities.

In a number of embodiments, the process 800 can gather algorithmic data related to the floorplan (block 820). In these embodiments, the types of methods that can be utilized to generate predictions and confidence levels can be determined. For example, a floorplan being managed by a hardware-based network device may have a fixed amount of computational resources available and/or only have access to a limited number of methods to generate predictions and confidence levels. However, a cloud-based network suite may have access to a large number of computations resources and methods to generate predictions and confidence levels. Algorithmic data can be configured to capture these available resources and options.

In various embodiments, the process 800 can determine a desired latency time for at least one of the network devices within the floorplan (block 830). In some embodiments, the generated predictions and confidence levels are for an overall network need. However, when faced with certain triggering events (e.g., a group of new clients enter an area of the floorplan), a specific network device may need a new configuration decision to made faster than other devices. In these types of embodiments, the desired latency associated with that network device may be shorter than for other network devices. Thus, in certain embodiments, the predictions and confidence level calculations are generated on a per-network device level and configurations are generated per device, and not as a whole floorplan network. Algorithmic data can be configured to capture what the latency needs, and selected options are for each network device within the floorplan.

In additional embodiments, the process 800 can select a method for generating predicted needs (such as capacity forecasts) based on at least the desired latency, topology data, and algorithmic data (block 840). As discussed above, methods for generating the predictions and confidence levels can vary in complexity and availability. However, based on the available data, a selection can be made that will provide the most accurate results within the amount of time required to utilize that result.

In further embodiments, the process 800 can generate a prediction for one or more points in time (block 850). Upon selecting a method of generation, the predictions and associated confidence level(s) can be determined. As discussed above, the generation of these predictions and/or confidence level(s) can be over a series of points in time. Each generation can include multiple predictions or may only include a prediction related to a single point in time.

In more embodiments, the process 800 can determine a predicted capacity for one or more network devices within the floorplan for at least one of the predicted points in time (block 860). Upon the prediction and/or confidence level(s) being generated, the process 800 can select a particular value from that data that can be utilized as a particular value that subsequent decisions may be based on. This value can relate to any network needs, such as overall predicted network bandwidth capacity both on a network scale and/or on a network device scale.

In a variety of embodiments, the process 800 can generate a transceiver configuration for at least one of the network devices within the floorplan based on at least the predicted capacity (block 870). While the embodiment depicted in FIG. 8 is directed to predicted capacity, it is contemplated that any network need may be handled with this process. In this embodiment, the transceiver configuration on or more of the network devices can be determined to be inefficient and thus should be adjusted via a sustainable network configuration that can be transmitted or otherwise directed to the network device(s) in question. In additional embodiments, the adjustments may not be related to a transceiver, but may be directed to have the network device itself de-energize or enter a lower-power mode.

Although a specific embodiment for a managing a network based on a desired latency associated with the generated predictions suitable for carrying out the various steps, processes, methods, and operations described herein is discussed with respect to FIG. 8, any of a variety of systems and/or processes may be utilized in accordance with embodiments of the disclosure. For example, the selection of complexity may be based on variability or reliability needs. If a network device is not being utilized much, it may require a less complex prediction method, while a high-use or mission critical network device may require or be assigned a more complex method of prediction and confidence level generation. The elements depicted in FIG. 8 may also be interchangeable with other elements of FIGS. 1-7 and 9 as required to realize a particularly desired embodiment.

Figure 9:
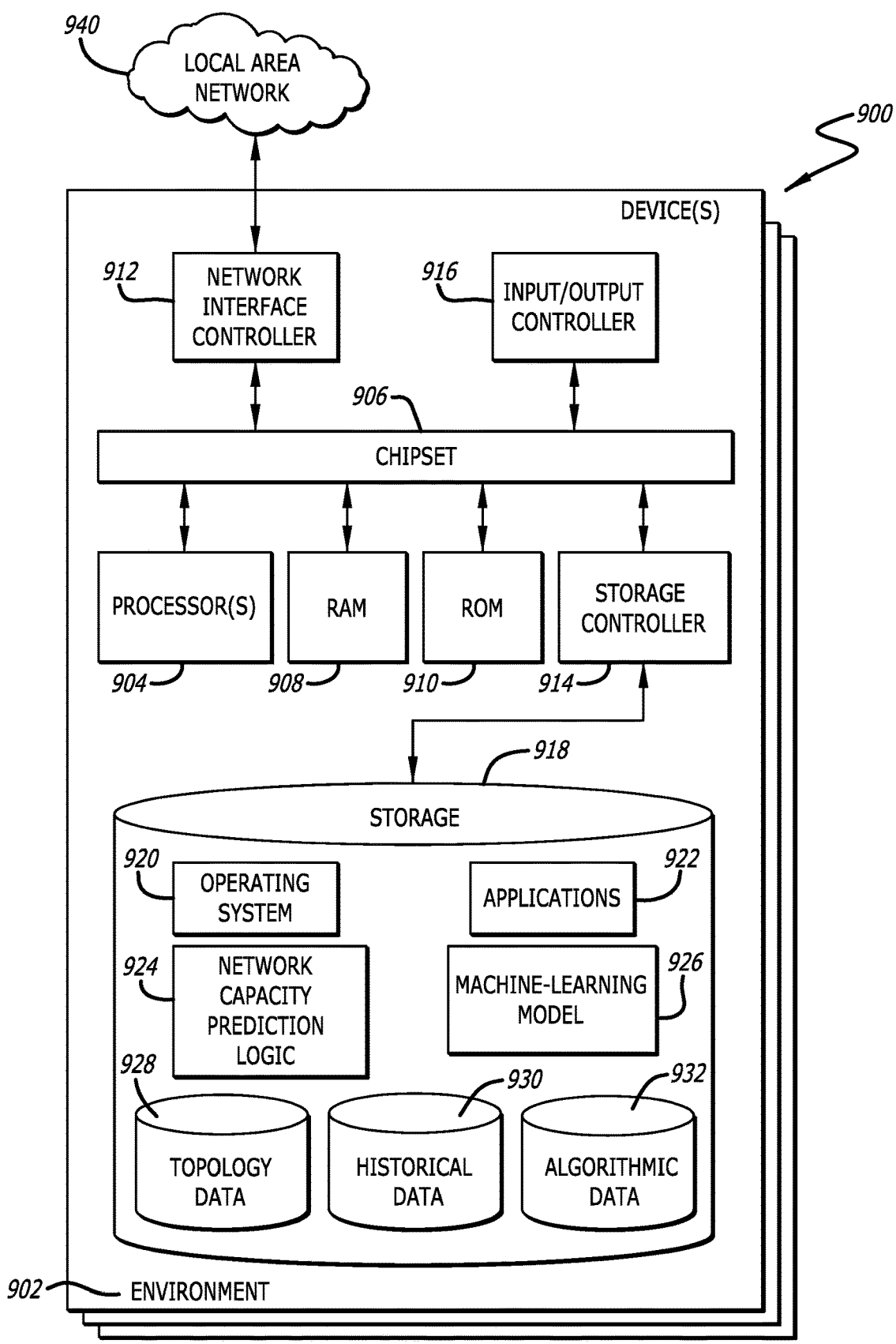
FIG. 9 is a conceptual block diagram of a device suitable for configuration with a network capacity prediction logic in accordance with various embodiments of the disclosure.

Referring to FIG. 9, a conceptual block diagram of a device suitable for configuration with a network capacity prediction logic in accordance with various embodiments of the disclosure is shown. The embodiment of the conceptual block diagram depicted in FIG. 9 can illustrate a conventional server computer, workstation, desktop computer, laptop, tablet, network device, router, switch, e-reader, smart phone, or other computing device, and can be utilized to execute any of the application and/or logic components presented herein. The device 900 may, in some examples, correspond to physical devices and/or to virtual resources and embodiments described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to communicatively couple a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications 922, and data 928, 930, 932, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include a network capacity prediction logic 924 that can be configured to perform one or more of the various steps, processes, operations, and/or other methods that are described above. While the embodiment shown in FIG. 9 depicts a logic focused on network capacity, it is contemplated that a more general "network needs" logic may be utilized as well or in lieu of such logic. Often, the network capacity prediction logic 924 can be a set of instructions stored within a non-volatile memory that, when executed by the controller(s)/processor(s) 904 can carry out these steps, etc. In some embodiments, the network capacity prediction logic 924 may be a client application that resides on a network-connected device, such as, but not limited to, a server, switch, personal or mobile computing device in a single or distributed arrangement. In certain embodiments, the network capacity prediction logic 924 can be a dedicated hardware device or be configured into a system on a chip package (FPGA, ASIC and the like).

In a number of embodiments, the storage 918 can include topology data 928. As discussed above, the topology data 932 can be collected in a variety of ways and may involve data related to multiple levels of the topology. The topology data 932 may be associated with an entire network or a portion/partition of a network. This may also include a relationship of the various associated APs that are associated with each other AP or network device such that relationships of how to transfer or "pre-move" clients back and forth can be determined based on the topology data 932 as currently understood. In additional embodiments, the topology data 932 can include not only the network devices and network traffic data associated within but may also include details about the hardware configuration and/or capabilities of the network devices within the floorplan. This can allow for more specific configurations based on various lower-power mode settings, or transceiver capabilities.

In various embodiments, the storage 918 can include historical data 930. As described above, historical data 930 can be configured to include various items such as past need levels, client connection histories, as well as previously determined paths for those client connections. In some embodiments, each non-stationary client may be determined to follow one or more of a limited number of determined paths within the floorplan, which can indicate seasonality but also provide insight into predictions on where the client may need to be handed off to another AP or even pre-moved. For example, a mobile computing device like a smart phone can be held by a person walking through a typical path on a floorplan to go from one area to another. The limited number of paths within an office floorplan may indicate where that client may be moving toward. In some embodiments, external data, such as calendaring data can be accessed or stored in historical data to inform of patterns or paths that the client may take. In additional embodiments, historical data 930 can be related to clients such that future predictions, such as with the ML models 926 can be utilized to better handle pre-moving clients when a known path is determined.

In still more embodiments, the storage 918 can include algorithmic data 932. As discussed above, a floorplan being managed by a hardware-based network device may have a fixed amount of computational resources available and/or only have access to a limited number of methods to generate predictions and confidence levels. However, a cloud-based network suite may have access to a large number of computations resources and methods to generate predictions and confidence levels. Algorithmic data 932 can be configured to capture these available resources and options. In still further embodiments, the algorithmic data 932 can be configured to capture what the latency needs, and selected options are for each network device within the floorplan.

Finally, in many embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to learn the pattern of the client traffic flow of various network devices and generate predictions and/or confidence levels regarding future network needs. In some embodiments, the ML model 926 can be configured to determine which method of generating those predictions would work best based on certain conditions or with certain network devices.

The ML model(s) 926 can be configured to generate inferences to make predictions or draw conclusions from data. An inference can be considered the output of a process of applying a model to new data. This can occur by learning from at least the topology data, historical data, and/or the algorithmic data and use that learning to predict future outcomes and needs. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 926 may be generated by human/administrator verifications or may compare predicted outcomes with actual outcomes.

Although a specific embodiment for a device suitable for configuration with a network capacity prediction logic suitable for carrying out the various steps, processes, methods, and operations described herein is discussed with respect to FIG. 9, any of a variety of systems and/or processes may be utilized in accordance with embodiments of the disclosure. For example, the device may be in a virtual environment such as a cloud-based network administration suite, or it may be distributed across a variety of network devices or APs such that each acts as a device and the network capacity prediction logic 924 acts in tandem between the devices. The elements depicted in FIG. 9 may also be interchangeable with other elements of FIGS. 1-8 as required to realize a particularly desired embodiment.

Information Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
  a processor;
  at least one network interface controller configured to provide access to a network; and
  a memory communicatively coupled to the processor, wherein the memory comprises a network capacity prediction logic that is configured to:
    determine a plurality of network devices within a floorplan;
    determine a status of one or more of the plurality of network devices within the floorplan;
    predict one or more capacity needs of the plurality of network devices at one more future points of time, wherein a prediction is made at particular intervals based on a desired reaction latency;
    generate one or more confidence levels for the predicted capacity needs at the point in time; and
    determine one or more network device configurations for at least one of the plurality of network devices.

2. The device of claim 1, wherein the network capacity prediction logic is further configured to transmit the one or more network device configurations to the plurality of network devices.

3. The device of claim 1, wherein the one or more needs is bandwidth capacity.

4. The device of claim 3, wherein the one or more network device configurations comprise at least transceiver power settings.

5. The device of claim 4, wherein the one or more network device configurations comprise at least a command for a network device to enter a lower-power mode.

6. The device of claim 4, wherein the one or more network device configurations are configured to provide sufficient bandwidth capacity within the floorplan.

7. The device of claim 6, wherein the sufficient bandwidth capacity is determined based on the one or more predicted needs of the plurality of network devices.

8. The device of claim 7, wherein the one or more network configurations provide sufficient bandwidth capacity while minimizing an amount of power required from the plurality of network devices.

9. The device of claim 1, wherein the network capacity prediction logic is further configured to evaluate historical data associated with the plurality of network devices.

10. The device of claim 9, wherein the predicted one or more needs is based on at least the determined plurality of network devices and the evaluated historical data.

11. The device of claim 1, wherein the predicted one or more needs are associated with a series of future time periods.

12. The device of claim 11, wherein the one or more confidence levels are associated with each of the series of time periods in the future.

13. The device of claim 12, wherein each of the series of time periods has one or more confidence intervals associated with it.

14. A device, comprising:
  a processor;
  at least one network interface controller configured to provide access to a network; and
  a memory communicatively coupled to the processor, wherein the memory comprises a network capacity prediction logic that is configured to:
    determine a plurality of network devices within a floorplan;
    determine a status of one or more of the plurality of network devices within the floorplan, wherein the status is associated with a current power or transceiver configuration;
    receive a desired latency period;
    determine a method of prediction generation based on the desired latency period;
    predict a capacity need of those plurality of network devices at
    one more future points of time, wherein a prediction is made at particular intervals based on a window of reaction latency;
    generate one or more confidence levels corresponding to the predicted capacity need at the point in time; and
    determine one or more network device configurations for at least one of the plurality of network devices.

15. The device of claim 14, wherein the method of prediction can include at least one or more thresholds.

16. The device of claim 14, wherein the method of prediction can include at least an autoregressive moving average.

17. The device of claim 14, wherein the method of prediction can include at least one or more machine-learning processes.

18. The device of claim 14, wherein the method of prediction can include a plurality of methods of increasing complexity.

19. The device of claim 18, wherein a longer desired latency period can be correlated to a method of prediction of increased complexity.

20. A method for managing a network associated with a floorplan, comprising:
- determining a plurality of network devices within a floorplan by receiving topology data;
- determining a status of one or more of the plurality of network devices within the floorplan;
- receiving a desired latency period;
- determining a method of generating predictions based on at least the desired latency period;
- predicting one or more capacity needs of those plurality of network devices utilizing the determined method at one more future points of time, wherein a prediction is made at particular interval based on a required latency at which data is needed;
- generating one or more confidence levels wherein the one or more confidence levels are based on at least the predicted one or more capacity needs at the point in time;
- determining one or more network device configurations for at least one of the plurality of network devices; and
- transmitting the one or more network device configurations to the at least one of the plurality of network devices.

* * * * *